E. M. HEYLMAN.
TRANSPORTATION TRUCK FOR DISK HARROWS.
APPLICATION FILED NOV. 8, 1909.

1,020,983.

Patented Mar. 26, 1912.
2 SHEETS—SHEET 1.

Witnesses:—

Inventor:—
Edward M. Heylman
By:— Peirce & Fisher
Attys.

E. M. HEYLMAN.
TRANSPORTATION TRUCK FOR DISK HARROWS.
APPLICATION FILED NOV. 8, 1909.

1,020,983.

Patented Mar. 26, 1912.

2 SHEETS—SHEET 2.

Witnesses:

Inventor:—
Edward M. Heylman
By Pierce & Fisher
Attys

UNITED STATES PATENT OFFICE.

EDWARD M. HEYLMAN, OF JANESVILLE, WISCONSIN, ASSIGNOR TO THE JANESVILLE MACHINE COMPANY, OF JANESVILLE, WISCONSIN, A CORPORATION.

TRANSPORTATION-TRUCK FOR DISK HARROWS.

1,020,983.    Specification of Letters Patent.    Patented Mar. 26, 1912.

Application filed November 8, 1909. Serial No. 526,870.

*To all whom it may concern:*

Be it known that I, EDWARD M. HEYLMAN, a citizen of the United States, and a resident of Janesville, county of Rock, and State of Wisconsin, have invented certain new and useful Improvements in Transportation-Trucks for Disk Harrows, of which the following is a specification.

The invention relates to trucks for transporting disk harrows to and from the field with the disks thereof held out of contact with the ground.

The present improvement seeks to provide a simple and effective form of truck which can be readily placed in operative position to support the disk gangs and removed from operative position to lower the gangs.

The invention consists in the features of improvement hereinafter set forth, illustrated in the accompanying drawings and more particularly pointed out in the appended claims.

Figures 1, 2:
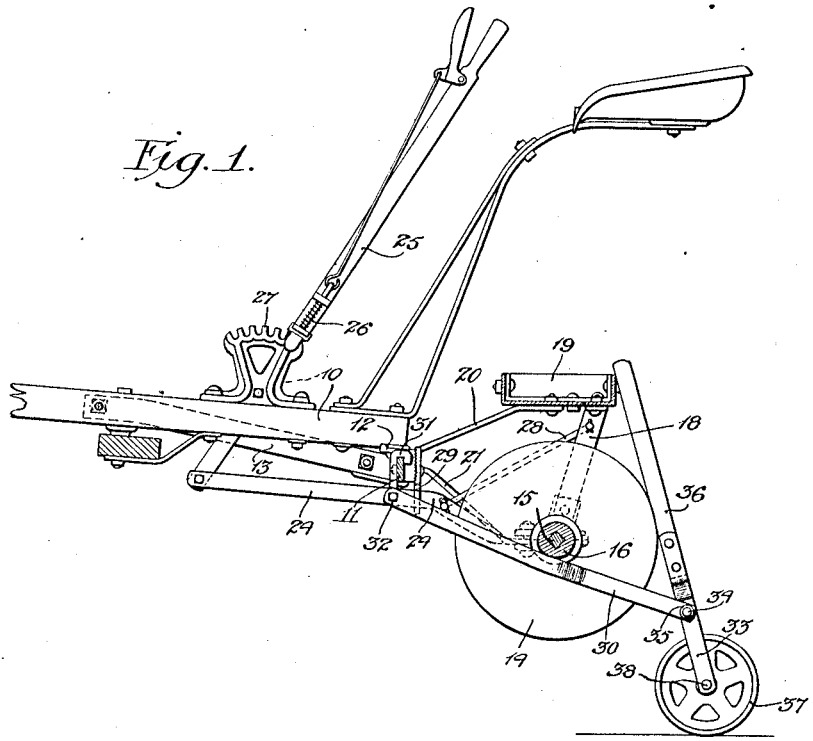
Figure 3:
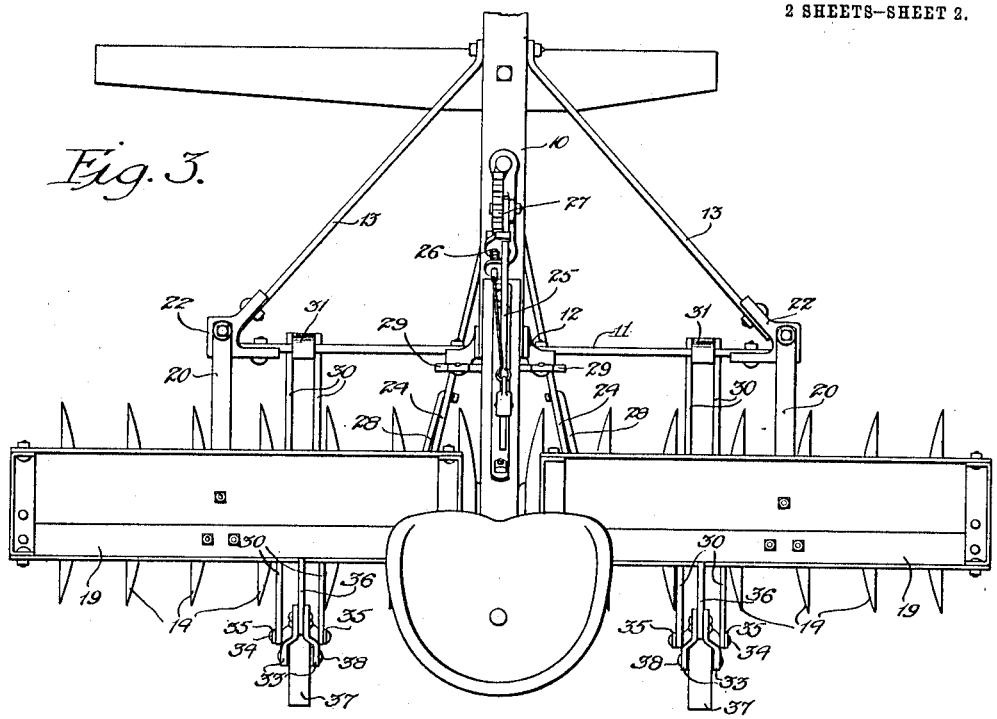
Figure 4:
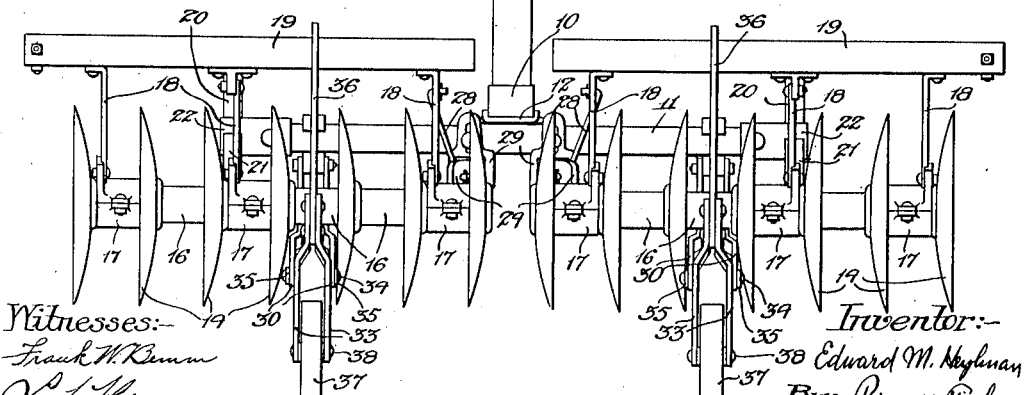

In the drawings Figure 1 is a view in section of a disk harrow with the improved truck applied thereto. Fig. 2 is a plan view of the improved truck detached from the harrow and with parts shown in section. Figs. 3 and 4 are plan and rear views of a disk harrow with the improved trucks applied thereto.

The improved transportation truck can be applied to different forms of disk harrows. The construction of the harrow frame shown in the drawings comprises a tongue 10, a transverse rear frame bar 11 connected to the rear end of the tongue by a bracket 12 and inclined brace bars 13 connecting the tongue and the ends of the transverse bar 11. The harrow, as usual, has two disk gangs, each comprising a set of disks 14 mounted on a shaft 15 and held in proper spaced relation thereon by a set of spacing sleeves or spools 16. Each shaft 15 is journaled in a set of bearings 17 which are fixed to the lower ends of a set of standards 18. A weight box 19 is fixed to the upper end of the standards and together with the standards forms the frame of the disk gang. The intermediate bearings 17 of each gang and the upper central portion of each gang frame are flexibly connected to the harrow frame by links 20 and 21, the forward ends of these links being pivoted to coupling brackets 22 which connect the ends of the harrow frame bars 11 and 13. The inner bearings of the gangs are connected by adjusting links 24 to the lower end of a shift lever 25 pivoted on the tongue 10 and by which the angle of the gangs to the line of draft may be adjusted. This lever is provided with the usual spring-held dog 26 arranged to engage a notched segment 27 on the tongue to hold the lever and gangs in adjusted position. Brace links 28 extend between the links 24 and the upper ends of the innermost standards 18 of the gangs. Adjustable stops 29 upon the bracket 12 engage the links 24 to limit the upward movement of the inner ends of the gangs.

A pair of transportation trucks, one for each gang, are employed for carrying the harrow to and from the field. Each truck comprises a supporting bar 30 which is adapted to extend beneath and engage one of the spacing sleeves 16 to support the gang. In the preferred form, this supporting bar comprises separate parallel members spaced apart, as shown. At its forward end, the supporting bar is provided with means for detachably engaging the harrow frame and which preferably comprises a hook 31, the hub of which is arranged between the forward ends of the supporting bar members and is pivotally and detachably connected thereto by a bolt 32.

A lever bar is pivotally connected to the rear end of the members of the supporting bar. This lever bar preferably comprises a pair of parallel members 33 which are arranged between the rear ends of the supporting bar members and are pivotally connected thereto by a transverse stud or bolt 34. This stud or bolt, as shown in Fig. 2, is provided with reduced end portions, which extend through the members of the supporting and lever bars and are provided with washers 35 and upset or riveted over outside the washers.

The upper ends of the members 33 of the lever bar, in the form shown, are connected to the lower end of an extension 36 which forms the upper portion of the lever bar. The lever bar is pivotally connected, as described, adjacent its lower end to the rear ends of the members of the supporting bar which are spaced apart somewhat farther than their forward ends. A wheel 37 is journaled to the lower end of the lever bar below the pivoted connection between the lever and supporting bars. The wheel 37 is arranged between the lower portions of the lever bar members 33 and is mounted upon a stud or shaft 38 having reduced ends which extend through the members 33, and are riveted over or upset outside the bar members.

When the harrow is to be transported to or from the field the trucks are placed in position with the supporting bars extending beneath the gang shafts inside the central bearings and standards for the gangs. The hooks 31 at the forward ends of the supporting bars are engaged with the rear transverse bar 11 of the harrow frame. Then by shifting the lever bars upwardly and forwardly into engagement with the upper portions of the gang frames the gangs will be raised from the ground. In this position the links 24 at the inner ends of the gangs bear upon the stops 29 and, inasmuch as the supporting trucks are arranged between these stops and the central bearings of the gangs that are connected to the ends of the harrow frame, the gangs will be properly supported in position. The upper ends of the lever bars, in operative position, engage the upper portions of the gang frames, that is to say, the weight boxes 19. If a scraper bar is arranged, as in some forms of harrows, at the rear of the weight boxes, the upper ends of the lever bars will engage the scraper supporting bars. In either case the lever bars, in operative position, are inclined rearwardly and downwardly from the upper portions of the gang frames and will thus be held in this position by the weight of the gangs upon the supporting bars 30. When the field is reached, the lever bars are swung rearwardly and downwardly, so that the disk gangs are lowered into contact with the ground. The hooks 31 can then be readily detached from the harrow frame and the trucks removed from position.

The improved truck is simple and inexpensive in its construction, can be readily applied in position and the lever bar thereof can be readily operated to raise and lower the disk gangs. The parts are so arranged that the disk gangs will be securely held in elevated position when it is desired to transport the harrow from one place to another.

The supporting bar 30 of the truck is bent or deflected laterally to a slight extent between its ends, so that, when arranged as shown in the drawings, the central deflected portion of the bar 30 is below a line drawn between the pivot bolts 32 and 34. The parts will be arranged, as shown, when a harrow having relatively small disks is to be transported. If the harrow has relatively large disks the hook 31 at the forward end of the supporting bar of each truck will be reversed in position. This reversal can be readily effected by removing the pivot bolt 32. Then when the truck is applied in position the central deflected portion of the supporting bar will be above the line of centers between the pivot bolts 32 and 34, and the gangs will be raised to a greater height to hold the relatively large disks thereof entirely clear of the ground. By reason of this arrangement the improved trucks can be employed with harrows having disks of different size.

It is obvious that changes may be made in the details set forth without departure from the essentials of the invention as defined in the claims.

I claim as my invention:—

1. A transportation truck for disk harrows comprising a supporting bar adapted to extend beneath and engage the disk gang and having means at its forward end for detachably engaging the harrow frame, a lever bar pivoted adjacent its lower end to the rear end of said supporting bar, and a wheel journaled on the lower end of said lever bar below its point of connection with said supporting bar, the upper end of said lever bar being arranged to engage the frame of the disk gang, substantially as described.

2. A transportation truck for disk harrows comprising a bent supporting bar for the disk gang having a reversible frame engaging device at its forward end, a lever bar pivoted to the rear end of said supporting bar and a wheel on the lower end of said lever bar, substantially as described.

3. The combination with a harrow frame and disk gangs connected thereto, of supporting bars extending beneath and engaging the hubs of the disk gangs, and having means at their forward ends detachably engaging the harrow frame, lever bars pivoted to the rear ends of said supporting bars and having wheels journaled on the lower ends, the upper ends of said lever bars engaging the frames of the disk gangs, substantially as described.

4. The combination with a harrow frame and disk gangs connected thereto, of supporting bars extending beneath and engaging the hubs of the disk gangs, and having pivoted hooks detachably engaging the harrow frame, lever bars pivoted adjacent their lower ends to the rear ends of said supporting bars, and wheels journaled on the lower ends of said lever bars, the upper ends of said lever bars engaging the frames of the disk gangs and inclining downwardly and rearwardly therefrom, substantially as described.

EDWARD M. HEYLMAN.

Witnesses:
FRANK H. FARNSWORTH,
WILLIAM F. BOSWORTH.

Copies of this patent may be obtained for five cents each, by addressing the "Commissioner of Patents, Washington, D. C."